United States Patent [19]

Ito

[11] Patent Number: 5,577,049
[45] Date of Patent: Nov. 19, 1996

[54] MULTIPLEXED SIGNAL TRANSMISSION SYSTEM

[75] Inventor: Kenji Ito, Saitama-ken, Japan

[73] Assignee: Kabushiki Kaisha Toshiba, Kawasaki, Japan

[21] Appl. No.: 480,294

[22] Filed: Jun. 7, 1995

Related U.S. Application Data

[63] Continuation of Ser. No. 118,585, Sep. 10, 1993, abandoned.

[30] Foreign Application Priority Data

Sep. 11, 1992 [JP] Japan ................................. 4-243741
Aug. 13, 1993 [JP] Japan ................................. 5-201551

[51] Int. Cl.$^6$ ............................................. H04L 25/34
[52] U.S. Cl. ............................................. 370/112; 375/264
[58] Field of Search ................................. 370/112, 44, 8, 370/9, 10, 11, 12; 375/259, 260, 261, 262, 263, 266, 267, 268, 286, 320, 353, 264; 358/315; 455/3.1, 6.1; 381/2, 3, 4, 5; 348/6, 485

[56] References Cited

U.S. PATENT DOCUMENTS

| | | | |
|---|---|---|---|
| 3,678,194 | 7/1972 | Orrell, Jr. ................................. | 375/17 |
| 4,498,167 | 2/1985 | Bowen ................................. | 370/44 |
| 5,293,633 | 3/1994 | Robbins ................................. | 370/17 |

OTHER PUBLICATIONS

Hanaoka, et al: "Head Switcher System for Consumer VCR". Digest of Technical Papers, ICCE, Jun. 1990, pp. 96–97.

S. Bellini et al., "A Hybrid Amplitude Frequency Modulation System," Alta Frequenza, vol. 45, No. 6, Jun. 1976, Milano It pp. 337–340.

Primary Examiner—Douglas W. Olms
Assistant Examiner—Dang Ton
Attorney, Agent, or Firm—Cushman, Darby & Cushman

[57] ABSTRACT

A multiplexed signal transmission system according to the present invention has a transmission section which includes an input for receiving a group of square pulses having a fixed phase relation to each other, a first generator for generating edge pulse trains containing all edges extracted from the square pulses in the phase sequence, a second generator for generating edge attribute information representing an attribute of edge following after a prescribed edge in the same edge pulse train, a converter for converting a plurality of parallel data composing of the edge attribute information and mode information for controlling a system status into a serial data, an aligner for aligning the serial data corresponding to the edge pulses after the edge pulses, a third generator for generating a four-level signal having a reference signal level, a first level associated with clocks for the serial data, a second level associated with the serial data superposed on the clock, and a third level associated with the edge pulses and a fourth generator for generating a transmission multiplexed signal by frequency modulation of the four-level signal.

37 Claims, 8 Drawing Sheets

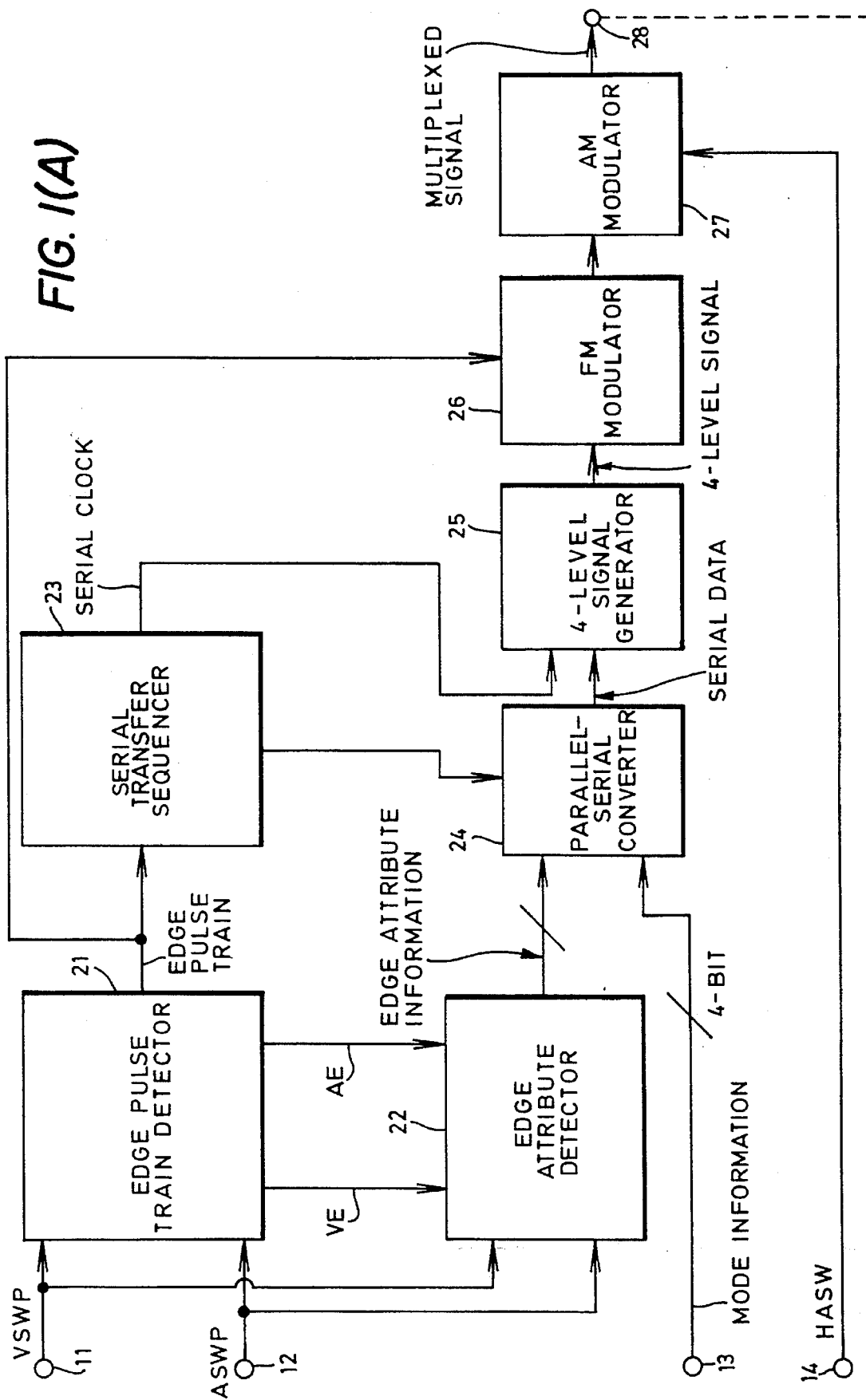

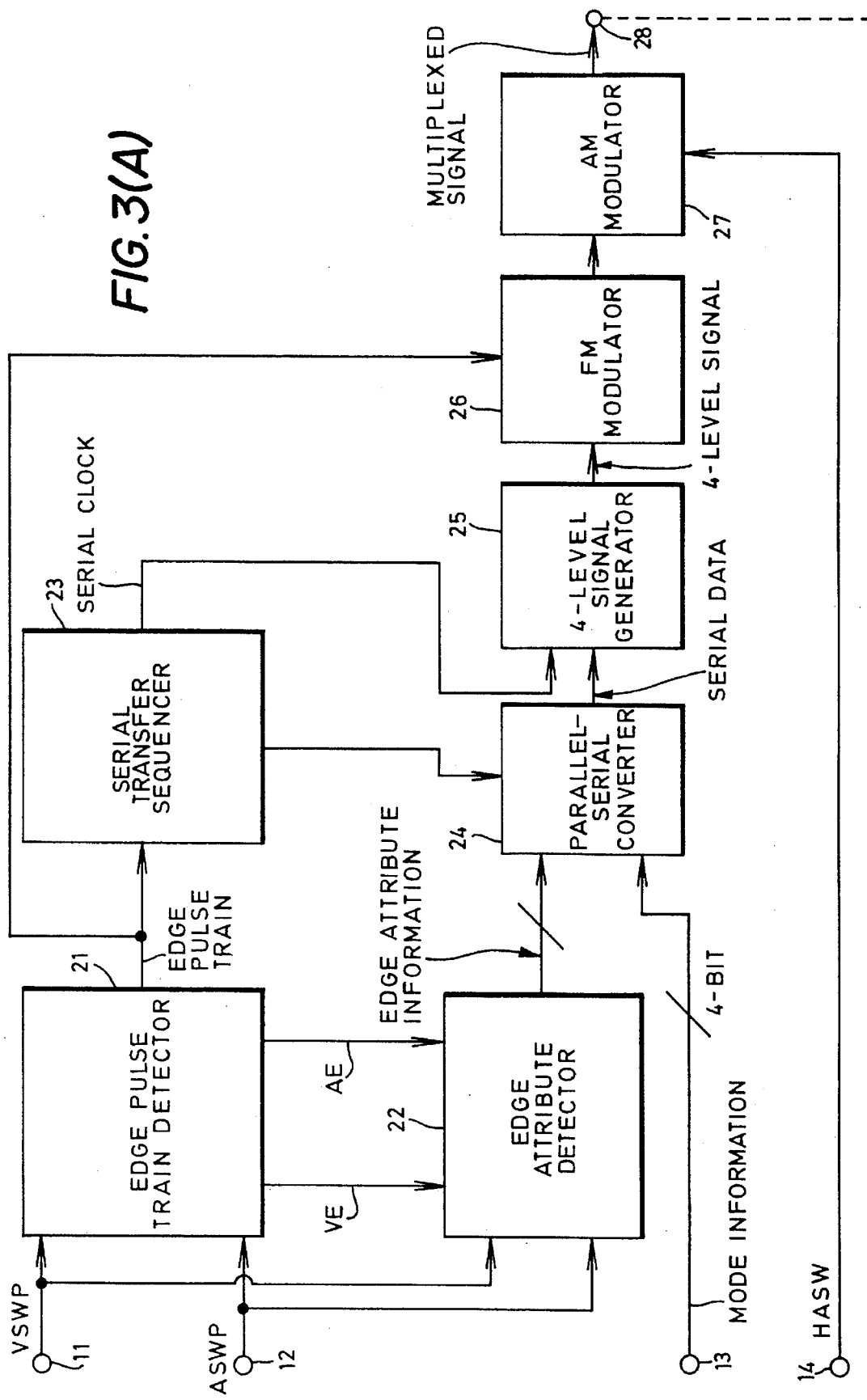

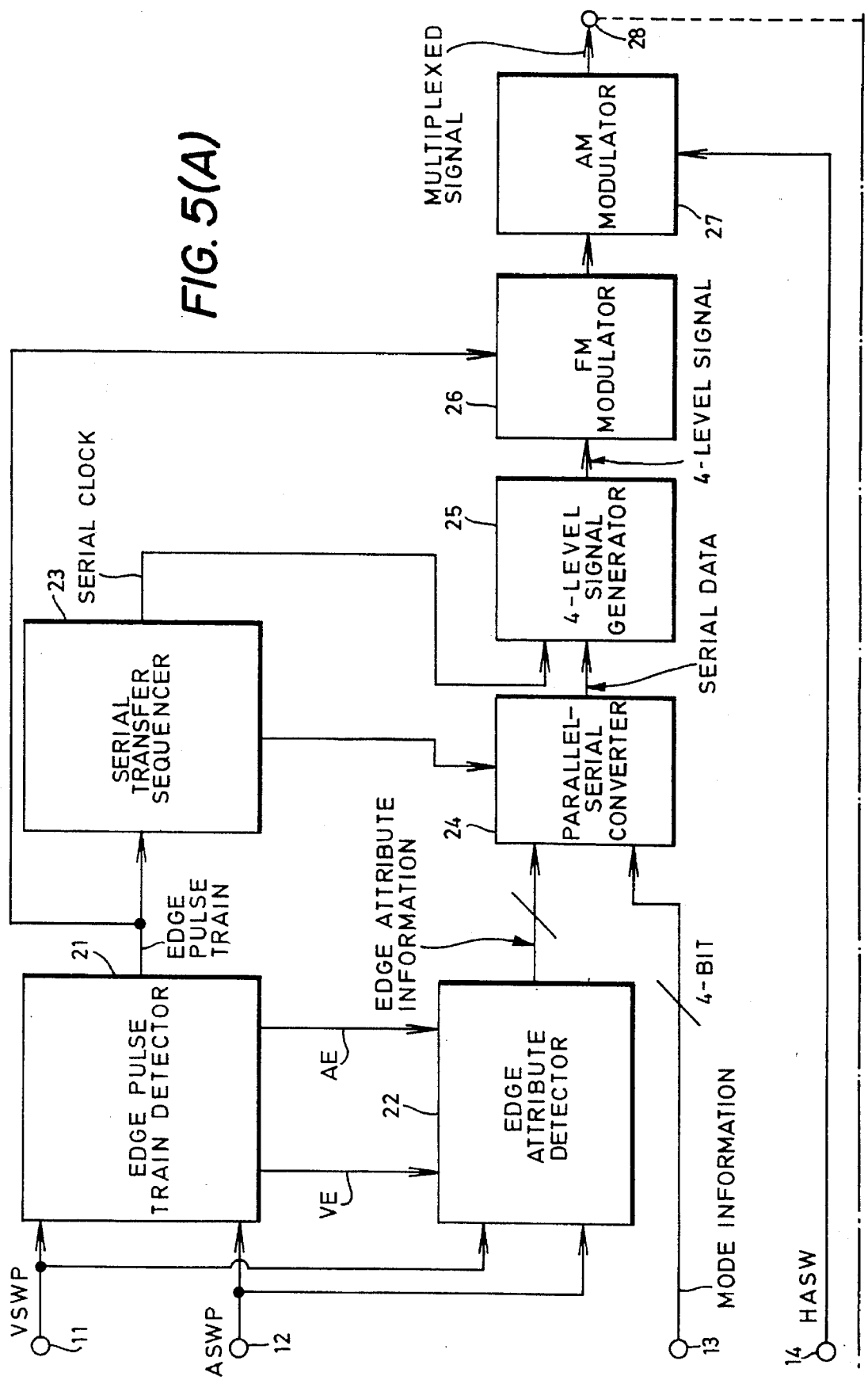

MULTIPLEXED SIGNAL TRANSMISSION SYSTEM

This a continuation of application No. 08/118,585, filed on Sep. 10, 1993, now abandoned which was abandoned upon the filing hereof.

FIELD OF THE INVENTION

The present invention relates generally to a multiplexed signal transmission system, and more particularly, to a multiplexed signal transmission system which transmits/receives switching pulses, mode information such as recording mode, playback mode, etc. through the minimum number of channels to/from a plurality of magnetic heads and amplifiers mounted on a rotary head of a video tape recorder.

BACKGROUND OF THE INVENTION

In a video tape recorder (hereinafter referred to as a VTR), video signals and audio signals are recorded or played back on/from a magnetic tape using a rotary head. Therefore, the rotary head is provided at a rotary substrate side of a rotary drum. As well known, a rotary transformer is used to transmit signals to this rotary head from a stationary circuit substrate section or from the rotary substrate section to the stationary substrate section, Recently, the functions of VTRs have been improved so that there are those VTRs which are capable of performing not only regular recording/playback operations simply using two rotary heads but also trick plays-provided with many rotary heads. In addition, such a system has been developed not only for recording/playback of video signals by a video rotary head but also for audio signal recording/playback on the same tracks as video tracks-.

As a result, rotary transformers provided with many transmission channels are in use and costs have become expensive, resulting the increase of the costs of the entire VTR sets. In addition, as various rotary heads have become selectable according to VTR specifications, rotary transformers have been demanded to have corresponding specifications and the number of models have increased, impeding their standardization.

To solve such problems, a new system has been developed to reduce the number of channels of a rotary transformer and to standardize rotary transformers by incorporating amplifiers for amplifying playback signals of the heads, a head selector switch for selecting over these amplifiers and a recording system distribution switch on a rotary substrate in the rotary drum, For instance, a system has been proposed at the ICCE (IEEE International Conference on Consumer Electronics) held on Jun. 6, 1990. In this system, a head switching signal for controlling a head selector switch provided on the rotary head section and such mode information as recording, playback, etc. are multiplexed and transmitted to the rotary head section through a single channel. That is, the head switching signal edge information is FM modulated and this FM wave is AM modulated to a single channel signal according to the mode information, making it possible to transmit a plurality of control signals through the single channel.

There are two head switching signals, i.e., a video head switching signal VSWP for switching the video head channels CH1 and CH2 and an audio head switching signal ASWP for switching the audio head channels CH1 and CH2. Normally, the mutual phase relation of these selector signals VSWP and ASWP is always kept constant. Further, when a control by a well known double azimuth four heads system is performed, a head amplifier switching signal HASW for switching a pair of SP heads and a pair of EP heads also becomes necessary. When a trick play in the SP mode is carried out by paying attention to this amplifier switching signal, the phase of this amplifier switching signal is variable. In addition, as mode information, not only the recording mode and the playback mode but also a trick play mode, head configuration information, etc. become necessary.

However, according to a conventional multiplexed signal transmission system, FM waves are AM modulated according to mode information, but the resolution of AM modulation level is restricted on the system, and thus the multiplexing becomes difficult. Therefore,at most only binary mode information showing the playback mode can be transmitted and the system is inferior in expandability. Further, the phase of the head amplifier switching signal HASW varies at a potential level as described above, and a means for transmitting such phase information simultaneously with this signal is demanded. Furthermore, if an FM demodulator at the rotary head section fluctuates, the DC level after demodulated may fluctuate and a malfunction can result.

As described above, a conventional rotary head amplifier system is restricted in transmission of many control signals and inferior in flexibility and therefore, a system which is capable of transmitting many kinds of control signals and providing a stable and efficient operation has been demanded.

Further, a video multi VTR with a head having almost same width as the track pitch (19μ) (hereinafter referred to as a narrow head) added in order to further promote a picture quality in the three-times mode (EP mode) and a Hi-Fi multi VTR (two kinds of paired Hi-Fi heads are required to satisfy the VHS Hi-Fi standard) which is capable of high fidelity recording/playback of all television signals of NTSC/PAL/SECAN color televisions systems have been proposed in recent years. In such VTRs it becomes an important factor that many kinds of control signals described above can be transmitted accurately in less channels to the rotary head section.

However, the multi-head system has not been sufficiently carried out fop a conventional rotary head amplifier system. For instance, in the case of a Hi-Fi VTR, it is necessary to reduce switching noise which is generated when switching a narrow head and an EP normal head, that is, the system switching of multi-head system but no countermeasure was carried out for reducing switching noise.

Here, a general consideration of a method for reducing head system switching noise of a multi-head system will be explained with reference to a video multi system.

FIG. 4(A) shows an example of the head arrangement of a video multi system. A1/A2 are Hi-Fi heads, S1/E2 and S1/E1 are conventional double azimuth four-heads, and N1/N2 are EP narrow heads. A timing chart for changing the head system from, for instance, E1 to N1 in this system is shown in a set of waveforms in FIGS. 4(B). In FIGS. 4(B), waveform (a) is a Hi-Fi head switching signal ASWP, waveform (b) is a video head switching signal VSWP, waveform (c) is an equivalent EP head switching signal EPSWP, waveform (d) is a narrow head switching signal and waveform (e) is a head system switching information. In these timing charts of FIG. 4(B), if the head system is switching during the indicated overlap period, head switching noises can be almost suppressed without causing the lack of playback signals as both E1 and N1 are kept in contact with a recording tape. In the rotary head amplifier system it is also necessary to transmit head system switching information to the rotary section during the similar period but no countermeasure has been made.

As described above, a conventional rotary head amplifier system is restricted in transmission of many control signals and inferior in flexibility and therefore, a system which is capable of transmitting many kinds of control signals and providing a stable and efficient operation has been demanded.

Further, when the rotary head amplifier system is applied to a multi-head VTR, if it is intended to transmit a head system switching information in addition to various switch selector signals and mode information, no sufficient measure has been provided to set the timing for the switching at a position where no noise is generated.

SUMMARY OF THE INVENTION

It is therefore an object of the present invention to provide a multiplexed signal transmission and receiving apparatus which is capable of transmitting many control signals accurately and stably through a single channel.

Another object of the present invention is to provide a multiplexed signal transmission and receiving apparatus which is capable of easily transmitting head system switching information when transmitting various switch selector signals and mode information, setting a head system switching timing at a position where no noise is generated and is applicable to both video multi system and Hi-Fi multi system.

In order to achieve the above objects, a multiplexed signal transmission system according to one aspect of the present invention has a transmission section which includes an input for receiving a group of square pulses having a fixed phase relation to each other, a first generator for generating edge pulse trains containing all edges extracted from the square pulses in the phase sequence, a second generator for generating edge attribute information representing an attribute of edge following after a prescribed edge in the same edge pulse train, a converter for converting a plurality of parallel data composing of the edge attribute information and mode information for controlling a system status into a serial data, an aligner for aligning the serial data corresponding to the edge pulses after the edge pulses, a third generator for generating a four-level signal having a reference signal level, a first level associated with clocks for the serial data, a second level associated with the serial data superposed on the clock, and a third level associated with the edge pulses and a fourth generator for generating a transmission multiplexed signal by frequency modulation of the four-level signal.

A multiplexed signal transmission system according to another aspect of the present invention has a receiving section which includes an input for receiving a multiplexed signal transmitted from the transmission section, a demodulator for demodulating the four-level signal from the received multiplexed signal by frequency demodulation, a decoder for decoding the serial data and the edge pulse train from the four-level signal, a first reproducer for reproducing the edge attribute information and mode information using the serial data and a second reproducer for reproducing the square pulses constructing the group of the square pulses using the edge attribute information.

In addition to the above construction, the above aspects of the present invention can include a detector for detecting edges of at least one square pulse of the group of the square pulses, and an extractor for extracting head switching information in the reproduced mode information at a timing of detecting the edges during an overlapping period of head systems.

Additional objects and advantages of the present invention will be apparent to persons skilled in the art from a study of the following description and the accompanying drawings, which are hereby incorporated in-and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIGS. 1(A)–2(B) are block diagram showing a first embodiment of the multiplexed signal transmission system according to the present invention;

FIG. 2 is a timing chart for explaining the operations of the system shown in FIG. 1;

FIGS.3(A)–3(B) are block diagram showing a second embodiment of the multiplexed signal transmission system of according to the present invention;

FIGS. 5(A)–5(B) are block diagram showing a third embodiment of the multiplexed signal transmission system of according to the present invention.

DESCRIPTION OF THE PREFERRED EMBODIMENTS

Figure 1B:
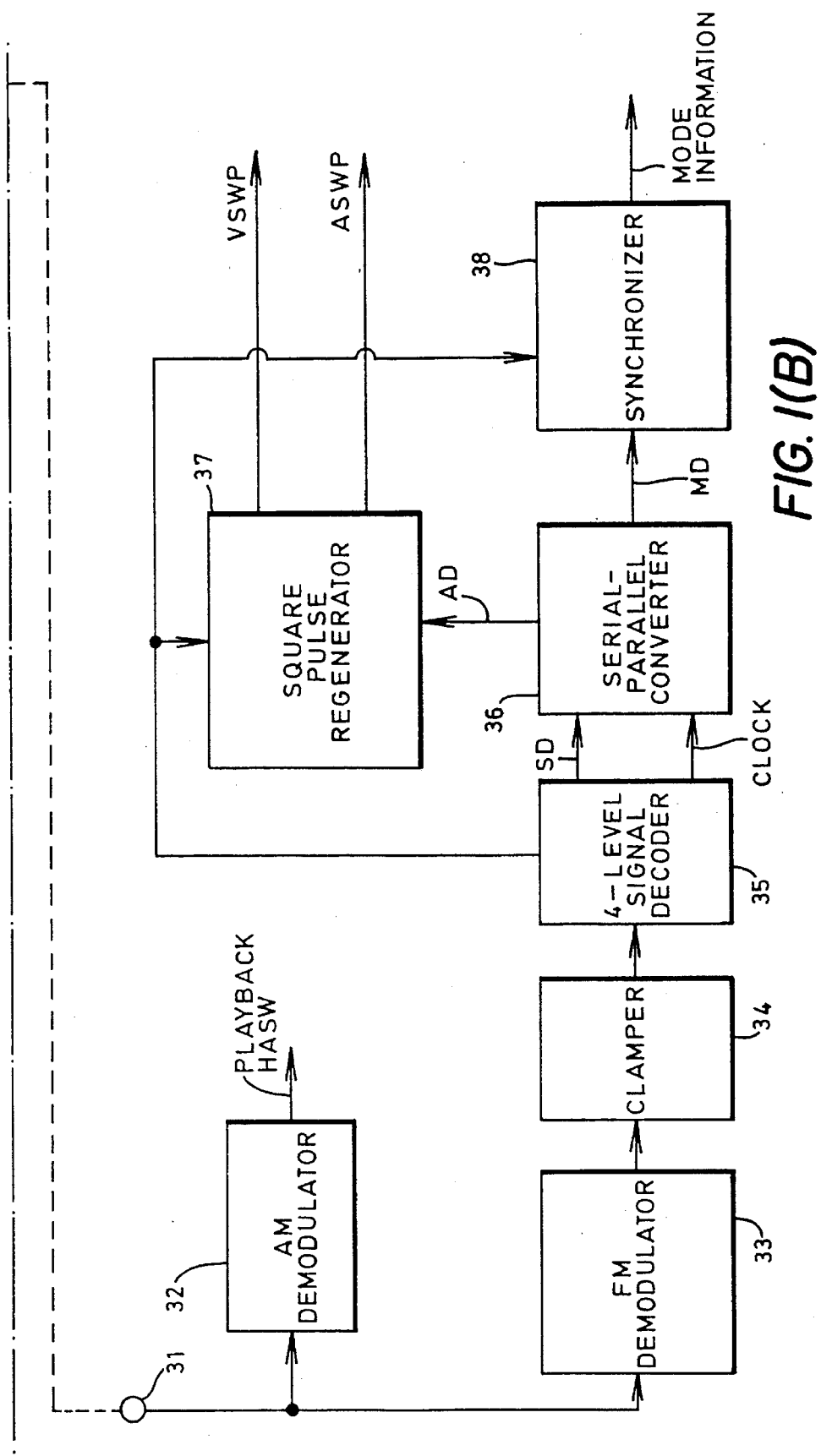

The present invention will be described in detail with reference to the FIGS. 1(A) through 5. Throughout the drawings, like or equivalent reference numerals or letters will be used to designate like or equivalent elements for simplicity of explanation.

Figure 2:
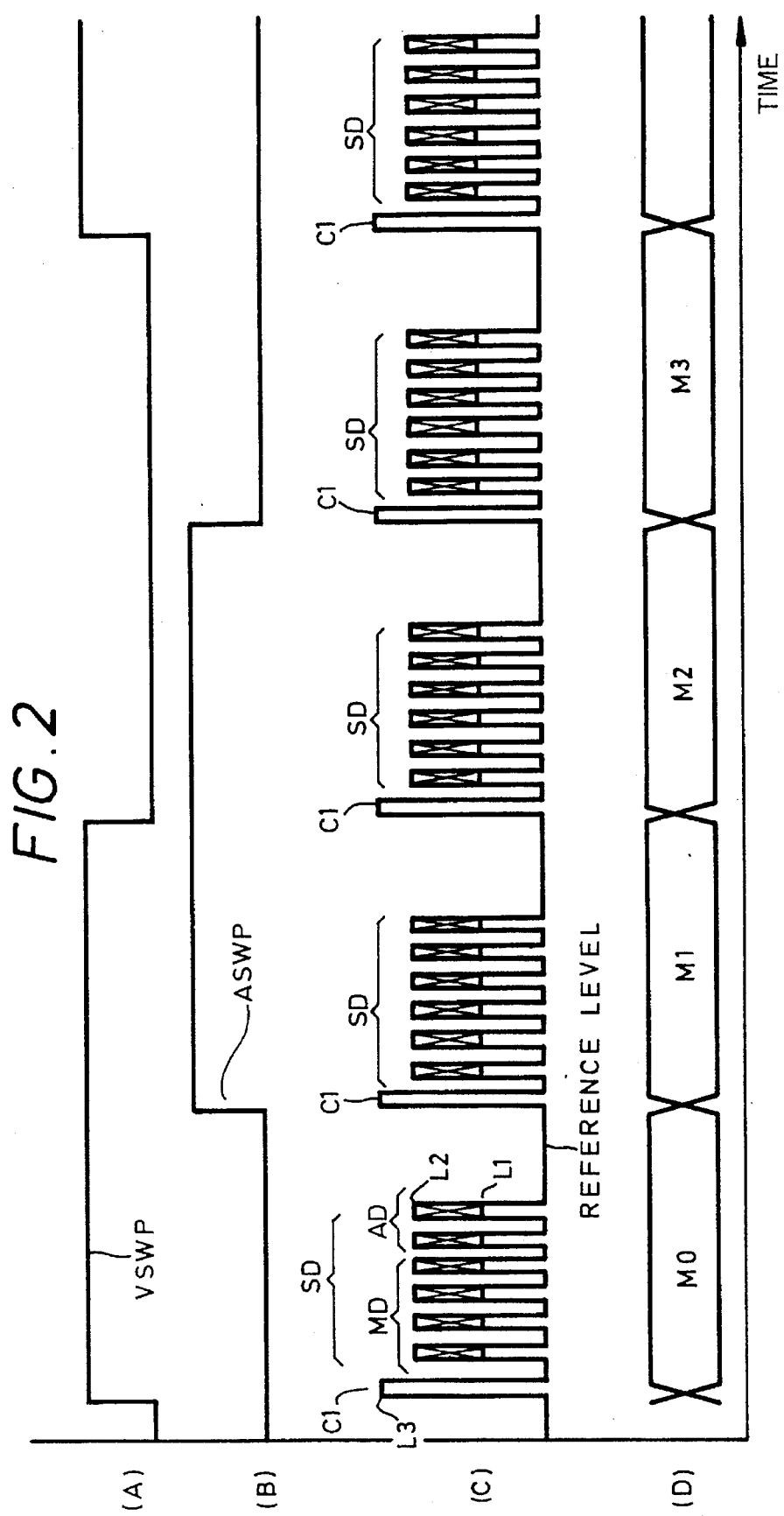

Referring now to FIGS. 1(A) and 2, a first embodiment of the multiplexed signal transmission system according to the present invention will be described in detail. FIGS. 1(A)–1(B) show a transmission section and a receiving section of the multiplexed signal transmission system, e.g., a stationary section and a rotary drum section of a VTR. FIG. 2 shows a signal waveform diagram for explaining the operation of the system shown in FIG. 1(A)–1(B). In FIG.1(A), a video head switching signal VSWP is supplied to an input terminal 11 and an audio head switching signal VSWP is supplied to an input terminal 12. Further, a plurality of mode information are supplied to an input terminal 13 while a head amplifier selecting signal HASW is supplied to an input terminal 14.

The video head switching signal VSWP and the audio head switching signal ASWP are input to an edge pulse train detector 21 and an edge attribute detector 22. The edge pulse train detector 21 outputs an edge pulse train, which includes a combination of all edges of a switching signal extracted in a phase sequence, to a serial transfer sequencer 23 and a four-level signal generator 25. Further, video edge pulse VE and audio edge pulse AF are supplied to the edge attribute detector 22. The edge attribute detector 22 is capable of predicting which signal's edge will come arise and how polarity changes by utilizing the conditions that mutual phase relation between the video head switching signal VSWP and the audio head switching signal VSWP is kept constant and that it is possible to specify a current edge within signal's edges. Based on this prediction, attribute information (polarity) of the following edge is generated and supplied to a parallel-serial converter 24 as edge attribute information (for instance, 2-bit parallel data). Mode information (for instance, 4-bit parallel data) from the input terminal 13 has been given to the parallel-serial converter 24.

The parallel-serial converter 24 has been supplied with a timing signal from the serial transfer sequencer 23 and outputs serial data based on this timing signal. This serial data is supplied to the four-level signal generator 25, serial clocks from the serial transfer sequencer 23 and edge pulse trains from the edge pulse train detector 21 have been supplied to the four-level signal generator 25.

Here, the video head switching signal VSWP, audio head switching signal ASWP, edge pulse train, serial data and serial clock will be explained with reference to FIG. 2.

Waveform (A) and (B) in FIG. 2 represent the video head switching signal VSWP and the audio head switching signal ASWP, respectively. These switching signals VSWP and ASWP are always kept in the constant phase relation to each other. Pulses Cl in waveform (C) are edge pulses representing the edge timings of the switching signals VSWP and ASWP extracted therefrom in a phase sequence, Then, following the edge pulses Cl, serial data SD are arranged. In the example in FIG. 2, the data SD are each constructed as a 6-bit serial data. A set of the first four bits of this serial data SD represents a mode information MD and a set of the latter two bits represents an edge attribute data AD. These bits data have been superposed on clocks, respectively.

The attribute data AD will be explained in detail below. This attribute data AD represents a polarity of the next coming edge by its contents. In the case of the example shown in FIG. 2, it shows the phase relation that the edge of the positive audio head switching signal ASWP comes next to the edge of the positive video head switching signal VSWP, the edge of the negative video head switching signal VSWP comes next to the edge of the positive audio head switching signal ASWP and further, the edge of the positive video head switching signal VSWP comes next to the edge of the negative video head switching signal VSWP.

Further, in the four-level signal generator 25, the following relation has been set for the edge pulse train, serial data and clock level. That is, clock has been set at a first level L1 against the reference level Lr, serial data superposed on this clock has been set at a second level L2, the edge pulse at a third level L3, and the entirety of these levels have formed the four-level signal.

The four-level signal thus obtained is frequency modulated (FM) at an frequency modulator 26 and this FM wave is further supplied to an amplitude modulator 27, where the FM wave is amplitude modulated (AM) by a head amplifier switching signal HASW and is transmitted as a multiplexed signal through single channel coupled to an output terminal of the transmitter section.

Now, a system for demodulating the multiplexed signal transmitted as described above will be explained.

The multiplexed signal is introduced into an input. terminal 31 and supplied to an amplitude demodulator 32 and a frequency demodulator 33. From the amplitude demodulator 32, a playback head amplifier switching signal HASW can be obtained. Further, playback four-level signal can be obtained form the frequency demodulator 33. This four-level signal is supplied to a clamper 34 and the reference level (the minimum potential) is reproduced for stabilizing the next decoding process. The clamper 34 requires a capacitor but as the minimum potential period is long, a capacitor in less capacity is sufficient and this makes it easy to incorporate a capacitor when integrating the clamper 34. The output of this clamper 34 (four-level signal) is supplied to a four-level signal decoder 35. In this decoder 35, an edge pulse train is reproduced in response to the four levels and it is possible to play back serial data SD (the former part mode information MD and the latter part edge attribute data AD) and clock. The serial data SD (including the mode information MD and the edge attribute data AD) is supplied to a serial-parallel converter 36. The serial-parallel converter 36 separates the mode information MD and the edge attribute data AD based on the clock and supplies the parallel converted edge attribute data AD to a square pulse regenerator 37 and the parallel converted mode information MD to a synchronizer 38. In the square pulse regenerator 37, the video head switching signal VSWP and the audio head switching signal ASWP are regenerated using the edge attribute data and edge pulse train. The synchronizer 38 outputs the mode information in synchronism with the edge pulse train as a system status switching signal. Waveform (D) of FIG. 2 shows that mode information M0, M1, M2, and so on were sent out.

The system described above is capable of transmitting various mode information and even when there exist many rotary heads, playback amplifiers, recording amplifiers, etc. on the rotary substrate section, is capable of transmitting this control information. Video head and audio head switching signals are not limited to only one set but can be combined in many sets. Further, in the trick play, outputs of a plurality of heads are selectively led out. In this case, the head output selection timing phase is not kept constant but is optionally selectable. Therefore, the head amplifier switching signal HASW can be transmitted successively with its output phase sequence determined in advance according to the trick play and by supplying it to the AM modulator. It is possible to hold mode information at the rotary substrate section and when clearing then, it can be controlled using the serial data. The rotary substrate section mode information using method can be freely designed according to functions and configurations of rotary head apparatus. Therefore, in the above embodiment, when square pulse edges were extracted in phase sequence, all edges were extracted. However, it is not necessary to extract all edges if the sequence or time is as set in advance. In addition, although the frequency modulated signal is to be transmitted after amplitude modulated by the second square pulse in the embodiment, the frequency modulated signal may be transmitted as it is.

Further, when transmitting the four-level signal, even if the FM demodulator fluctuates, decoding error in the decoder can be eliminated by clamping demodulated output as the minimum potential has been set. Further, the power supply to the rotary substrate section may be made by, for instance, a transmission means using a slip ring. In addition, in the example shown in the figure, it is shown to transmit serial data immediately after edge pulses. It is however sufficient to complete transfer of related serial data between respective edge pulses. However, transfer of serial data must be completed before arrival of the following edge and many more data can be transmitted when the transfer is started immediately after the edge pulses. Further, the reference level may be set in the section where no serial data exist although in the above explanation, it was explained that the reference level present in the serial data section.

Referring now to FIGS. 3(A)–3(B), 4(A) and 4(B), a second embodiment of the multiplexed signal transmission system according to the present invention will be described.

Figure 3B:
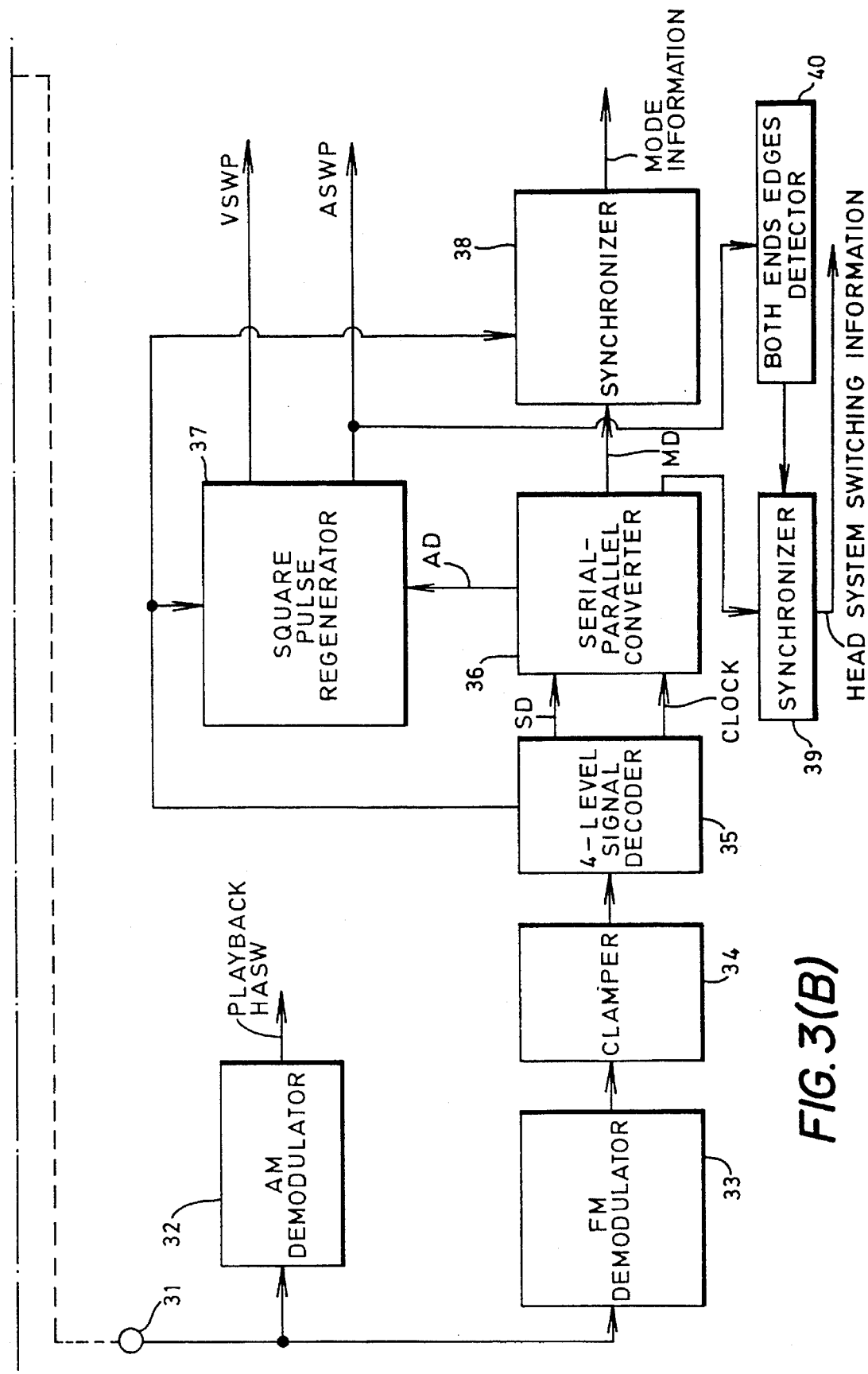

In FIGS. 3(A)–3(B), the same reference numerals have been assigned to the same parts as in FIGS. 1(A)–1(B). Those parts differing from the embodiment in FIGS. 1(A)–1(B) will be explained. At the receiving section, the audio head switching signal ASWP from the square pulse regenerator 37 is further led to a both ends edges detector 40. The edge pulse detected in the both ends edges detector 40 is supplied to the synchronous pulse input terminal of a synchronizer 39. To this input terminal of the synchronizer 39, the data output terminal of the serial-parallel converter 36 is connected. Head system switching information is led to this data output terminal. This head system switching information is supplied to the head system switching system through the synchronizer 39 at the center of the head system overlap period.

Figure 4A:
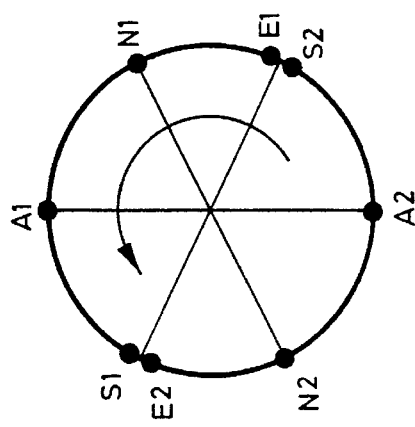
FIG. 4(A) is a head system diagram and FIG.4(B) is a timing chart explaining an example of the operation of the system shown in FIG. 3.
Figure 4B:
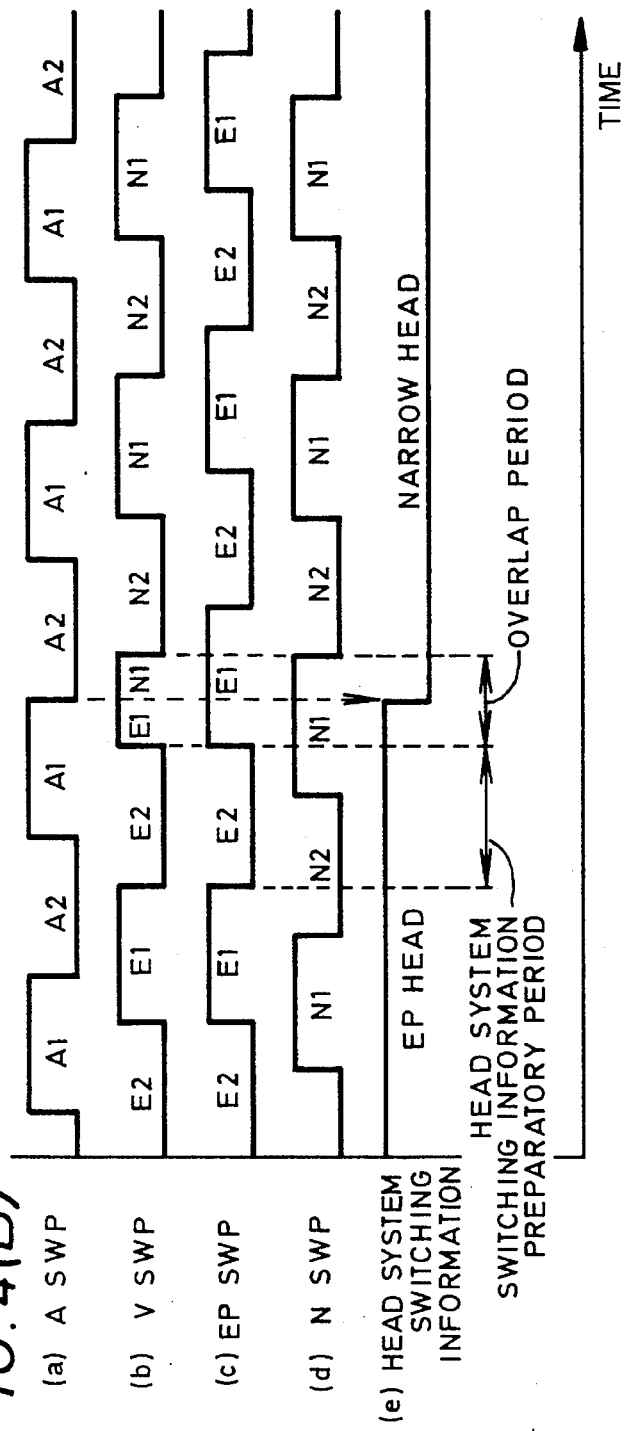

FIG. 4(A) shows an example of the video multi-system heads arrangement. A1/A2 are the Hi-Fi heads, S1/E2 and S1/E1 are the double azimuth four heads, and N1/N2 are the EP narrow heads. The timing chart for changing the head systems, for instance, from E1 to N1 in this system is shown in FIG. 4(A). In FIG. 4(B) waveform (a) is the Hi-Fi head switching signal ASWP waveform, (b) is the video head switching signal VSWP waveform, (c) is the EP head switching signal EPSWP waveform, (d) is the narrow head switching signal and waveform (e) is the head system switching information. In this timing chart, if the head system is switching during the indicated overlap period, head switching noises can be almost suppressed without causing lack of any portion of playback signal as both the E1 and N1 are kept in contact with a recording tape.

Now, an example for transmission and receiving of the head system switching information will be explained. First, when transmitting the head system switching information from the stationary section, the head system switching information is transmitted (prepared) in the corresponding switching signal period (the E2 head active period in FIG. 4) before the overlap period. There are two periods for this transmission. One is a prescribed period from the leading edge of the audio head switching signal ASWP and the other is a prescribed period from the trailing edge of the video head switching signal VSWP. Even when the head system switching information is transmitted in either period, the head system switching information output timing will agree with the failing time of the audio head switching signal ASWP at the rotary section because the synchronizer 39 has been provided. Whenever the head system switching information is output in synchronization with this falling edge, the point of time for switching exists at the center of the overlap period as illustrated in FIG. 4(B).

In this embodiment, the head system switching information is output in synchronism with the edge of the audio head switching signal ASWP by the synchronizer 39. So, the head system switching information preparatory period at the transmission section can be any period out of the half period of the video head switching signal VSWP. Therefore, a microcomputer which, generating the head system switching information at the receiving section and sending it to the serial-parallel converter 24, increases the degree of freedom for its transfer time. Thus, the head system switching information is output at a proper point of time at the rotary section.

Figure 5B:
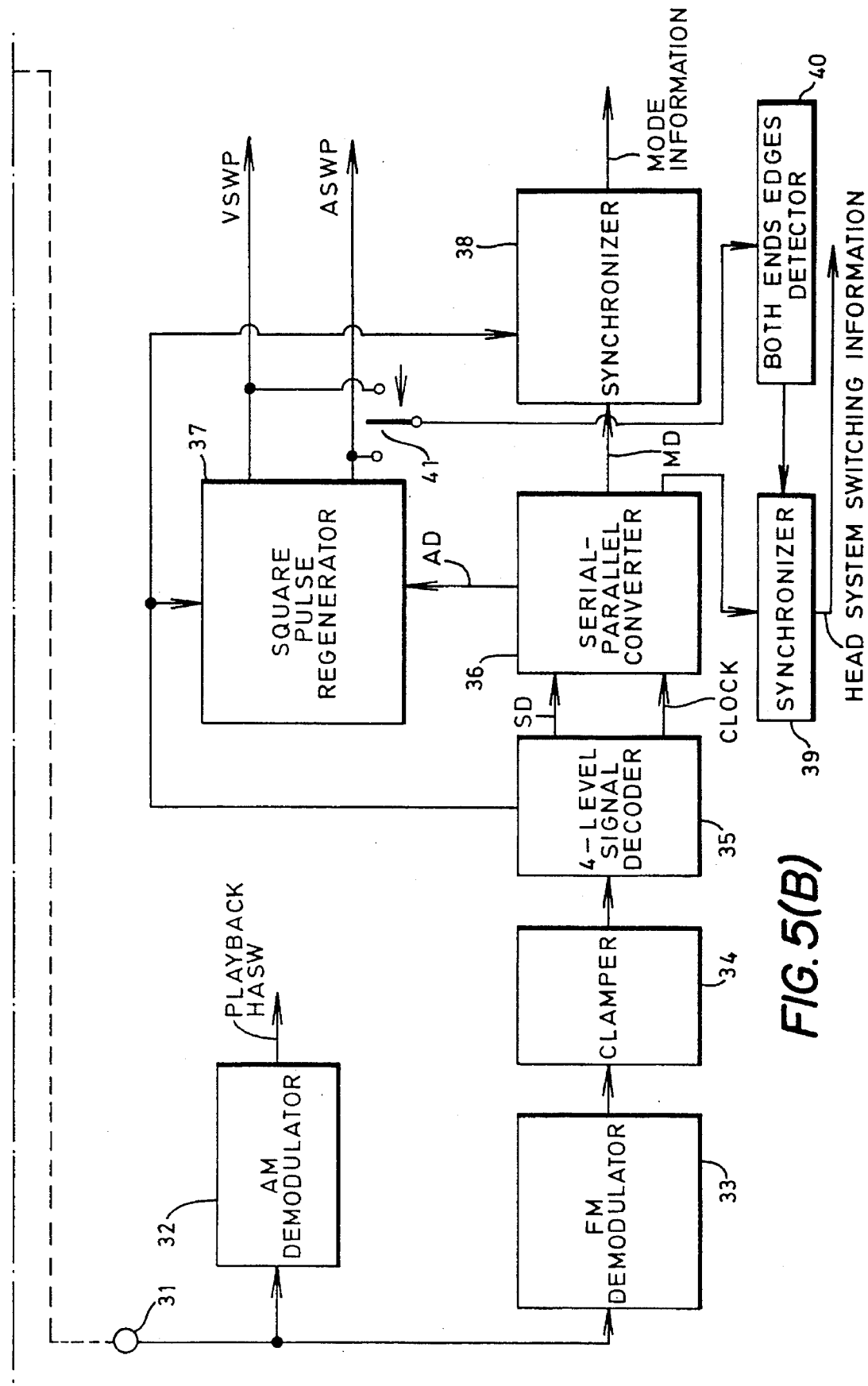

FIGS. 5(A)–5(B) illustrate the third embodiment of the present invention.

In this embodiment, the apparatus of the present invention is applicable to both the video multi-system and the Hi-Fi multi-system. This embodiment is almost the same as the second embodiment illustrated in FIGS. 3(A)–3(B) and the same signs have been assigned to the same parts. What are differing from those in the second embodiment shown in FIG. 3(A) are that the audio head switching signal ASWP and the video head switching signal VSWP have been connected to each of two input terminals of a selector 41, respectively and the selected output of this selector 41 is supplied to the both ends edges detecting circuit 40. The selector 41 selects the audio head switching signal ASWP like before when switching the video head systems, and selects the video head switching signal VSWP when switching the audio head systems. Thus, when switching the video head systems and the audio head systems, any head system is selectable at the center of respective overlap periods.

Further, in this case the control signal of the selector 41 may be transmitted through the information route from the rotary section or it may be preset in advance at the rotary section according to the head system (the video multi-system, the Hi-Fi multi-system). The stationary section and the rotary section circuits have been composed of integrated circuits, respectively and can be used as highly flexible systems.

As described above, according to the present invention it is possible to transmit many control signals accurately and stably through single channel and the degree of freedom can be further expanded. In addition, it is also possible to output the head system switching information at a proper timing (at the center of the overlap period) at the rotary section in the multi-heads system, suppressing generation of switching noise. However, a timing to transmit the head system switching information from the stationary section is not subject to a severe restriction but it is possible to give a margin to a data output timing program of a microcomputer, etc. at the transmission section. Further, if the rotary section and the stationary section have been integrated on a single chip, the circuit of the present invention will have an extremely high adaptability to various rotary head systems.

As described above, the present invention can provide an extremely preferable multiplexed signal transmission system.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made,to adapt a particular situation or material to the teaching of the present invention without departing from the central scope thereof. Therefore, it is intended that the present invention not be limited to the particular embodiment disclosed as the best mode contemplated for carrying out the present invention, but that the present invention include all embodiments falling within the scope of the appended claims.

What is claimed is:

1. A multiplexed signal transmission system comprising:
   means for receiving a first group of square pulses having a fixed phase relation to each other, the first group of square pulses including a first edge and a second edge following the first edge;
   means for generating an edge pulse train containing in sequence all edges extracted from the first group of square pulses;

means for generating edge attribute information representing an attribute of the second edge following the first edge;

means for converting a plurality of parallel data including the edge attribute information and mode information that controls a system status into serial data;

means for aligning the serial data in the edge pulse train such that the serial data is located after the edge pulses corresponding to the serial data;

means for generating a four-level signal having a reference signal level, a first level associated with a clock level for the serial data, a second level associated with the serial data superposed on the clock level and a third level associated with the edge pulses; and means for generating a transmission multiplexed signal by frequency modulating the four-level signal.

2. A multiplexed signal transmission system as claimed in claim 1, wherein the four-level signal generating means comprises means for establishing a level period between a first group of serial data and a following edge pulse, the level period being a period in which there exists no serial data and serving as the reference signal level in the four-level signal.

3. A multiplexed signal transmission system as claimed in claim 1, further comprising means for modulating the transmission multiplexed signal by a second group of square pulses to obtain a final transmission multiplexed signal.

4. A multiplexed signal transmission system as claimed in claim 3, wherein the first group of square pulses contains a video head switching signal and an audio head switching signal, and the second group of square pulses contains information for switching head amplifiers provided on a rotary head section substrate of a video tape recorder, and wherein the mode information contains information for switching various switches provided on the rotary head section substrate.

5. A multiplexed signal receiving system comprising:

means for receiving a multiplexed signal transmitted from a transmission section, the multiplexed signal including a four-level signal, the four-level signal including an edge pulse train and serial data associated with edge pulses in the edge pulse train, the serial data including edge attribute information and mode information that controls system status;

means for demodulating the four-level signal from the received multiplexed signal by frequency modulation;

means for decoding the serial data and the edge pulse train from the four-level signal;

means for reproducing the edge attribute information and mode information using the serial data; and means for reproducing square pulses and constructing a first group of the square pulses using the edge attribute information.

6. A multiplexed signal receiving system as claimed in claim 5, wherein the four-level signal includes a reference level in which no serial data is provided, and wherein the demodulating means comprises means for playing back the reference level by clamping the reference level of the frequency modulated four-level signal to a constant level.

7. A multiplexed signal receiving system as claimed in claim 5, further comprising means for extracting a second group of second square pulses which are included in the multiplexed signal by amplitude transmission signals.

8. A multiplexed signal receiving system as claimed in claim 7, wherein the first group of square pulses contains a video head switching signal and an audio head switching signal, the second group of square pulse contains information for switching head amplifiers provided on a rotary head section substrate of a video tape recorder, and wherein the mode information contains information for switching various switches provided on the rotary head section substrate.

9. A multiplexed signal transmission system comprising:

means for receiving a first group of square pulses having a fixed phase relation to each other, the first group of square pulses including a first edge and a second edge following the first edge;

means for generating an edge pulse train containing in sequence all edges extracted from the first group of square pulses;

means for generating edge attribute information representing an attribute of the second edge following the first edge;

means for converting a plurality of parallel data including the edge attribute information and mode information for switching head systems of a multi-head system into serial data;

means for aligning the serial data in the edge pulse train such that the serial data is located after the edge pulses corresponding to the serial data;

means for generating a four-level signal having a reference signal level, a first level associated with a clock level for the serial data, a second level associated with the serial data superposed on the clock level and a third level associated with the edge pulses; and means for generating a transmission multiplexed signal by frequency modulating the four-level signal.

10. A multiplexed signal transmission system as claimed in claim 9, wherein the first group of square pulses includes a video head switching signal, and wherein the multi-head system includes an audio multi-head system.

11. A multiplexed signal transmission system as claimed in claim 9, wherein the first group of square pulses includes a audio head switching signal, and wherein the multi-head system includes a video multi-head system.

12. A multiplexed signal transmission system as claimed in claim 9, wherein the first group of Square pulses includes a video head switching signal and an audio head switching signal which are selectively supplied to the means for generating an edge pulse train.

13. A multiplexed signal receiving system comprising:

means for receiving a multiplexed signal transmitted from a transmission section, the multiplexed signal including a four-level signal, the four-level signal including an edge pulse train and serial data associated with edge pulses in the edge pulse train, the serial data including edge attribute information and mode information that includes head system switching information;

means for demodulating the four-level signal from the received multiplexed signal by frequency modulation;

means for decoding the serial data and the edge pulse train from the four-level signal;

means for reproducing the edge attribute information and mode information using the serial data;

means for reproducing square pulses and constructing a first group of the square pulses using the edge attribute information;

means for detecting at least one square pulse edge out of the first group of square pulses; and means for reading head system switching information contained in the mode information during a multi-head system overlap period.

14. A multiplexed signal transmission system as claimed in claim 13, wherein the first group of square pulses includes a video head switching signal, and wherein the multi-head system includes an audio multi-head system.

15. A multiplexed signal transmission system as claimed in claim 13, wherein the first group of square pulses includes a audio head switching signal, and wherein the multi-head system includes a video multi-head system.

16. A multiplexed signal transmission system as claimed in claim 9, wherein the first group of square pulses includes a video head switching signal and an audio head switching signal which are selectively supplied to the means for generating an edge pulse train.

17. A multiplexed signal transmission system comprising:
   means for receiving a first square pulse train in which each square pulse is aligned at a fixed phase relation to each other;
   means for generating edge attribute information indicative of a relationship between edges of square pulses in the first square pulse train and a timing of a square pulse;
   means for converting a plurality of parallel data including control information and mode information into a serial data;
   means for aligning the serial data between edges of the square pulses in the first square pulse train;
   means for generating a signal having a reference level, a first level serving as a clock level for the serial data, and a second level corresponding to the serial data superposed on the clock level; and
   means for generating a transmission multiplexed signal by frequency modulating the signal.

18. A multiplexed signal transmission system as claimed in claim 17, wherein the signal generating means further comprises means for establishing a space period which includes no serial data, the space period corresponding to the reference level.

19. A multiplexed signal transmission system as claimed in claim 17, further comprising means for frequency-modulating the transmission multiplexed signals by a second square pulse train.

20. A multiplexed signal transmission system as claimed in claim 19, wherein the first square pulse train comprises a video head switching signal for switching at least two video heads provided on a rotary section of a video tape recorder and an audio head switching signal for switching at least two audio heads, and wherein the second square pulse train contains information for switching electric circuits provided on the rotary head section of the video tape recorder.

21. A signal transmission system, comprising:
   a stationary section producing a control signal;
   a rotary section including a plurality of rotary heads for recording or reproducing information signals on or from a record medium and circuit members for supplying the rotary heads with the information signals or amplifying the information signals reproduced from the rotary heads;
   means provided on the stationary section for converting the control signal to a serial signal;
   means for modulating the serial signal;
   means for transmitting the modulated serial signal to the rotary section;
   means provided on the rotary section for receiving the modulated serial signal;
   means provided on the rotary section for demodulating the modulated serial signal; and
   means for restoring the control signal from the demodulated serial signal.

22. A signal transmission system as claimed in claim 21, wherein the control signal comprises a head switching signal for switching the plurality of rotary heads and a mode signal for controlling the operation of the circuit members.

23. A signal transmission system for transmitting a square pulse signal including a sequence of square pulses to a circuit for controlling the circuit at timings of a leading edge and a trailing edge of the square pulse signal, comprising:
   means for generating an edge pulse train, wherein each edge pulse included therein corresponds to an edge of a square pulse in the sequence of square pulses;
   means for generating edge attribute information indicative of a relationship between each edge of the square pulses timing of a square pulse;
   means for converting the edge attribute information into serial data;
   means for aligning the serial data between an edge pulse associated with the trailing edge of a first square pulse in the sequence of square pulses and an edge pulse associated with the leading edge of a second square pulse in the sequence of square pulses;
   means for modulating the edge pulse train including the attribute information;
   means for transmitting the modulated edge pulse train;
   means for receiving the transmitted edge pulse train;
   means for demodulating the received edge pulse train; and
   means for restoring the sequence of square pulses from the demodulated attribute information and the edge pulse train.

24. A signal transmission system comprising:
   a stationary section that produces a control signal;
   a rotary section including a plurality of rotary heads for recording or reproducing information signals on or from a record medium and circuit members for supplying the rotary heads with the information signals or amplifying the information signals reproduced from the rotary heads;
   means provided on the stationary section for generating an edge pulse train, wherein each edge pulse in the edge pulse train corresponds to an edge of a square pulse in a sequence of square pulses;
   means for generating edge attribute information indicative of a relationship between each edge pulse and a timing of a leading edge or a trailing edge of a square pulse in the sequence of square pulses;
   means for converting the edge attribute information to a serial signal;
   means for modulating the serial signal and the edge pulse train;
   means for transmitting the modulated signal to the rotary section;
   means provided on the rotary section for receiving the modulated serial signal;
   means provided on the rotary section for demodulating the modulated serial signal;
   means provided on the rotary section for restoring the edge attribute information from the demodulated serial signal; and
   means provided on the rotary section for restoring the sequence of square pulses from the demodulated serial signal based on the restored edge attribute information.

25. A transmission system as claimed in claim 24, wherein the control signal is an operation mode information signal for setting operation modes of the circuit members, and the operation mode information signal is converted to the serial signal along with the edge attribute information.

26. A multiplexed signal receiving system comprising:

means for receiving a multiplexed signal transmitted from a transmission section;

means for demodulating a multi-level signal from the received multiplexed signal by frequency demodulation;

means for decoding serial data and an edge pulse train from the multi-level signal;

means for reproducing edge attribute information and mode information from the serial data; and means for reproducing a first square pulse train using the edge attribute information.

27. A multiplexed signal receiving system as claimed in claim 26, wherein the demodulating means comprises means for playing back a reference level in the multi-level signal by clamping a period in which there exists no serial data in the frequency demodulated multi-level signal to a constant level.

28. A multiplexed signal receiving system as claimed in claim 26, further comprising means for extracting a second square pulse train from the multiplexed signal transmitted from the transmission section.

29. A multiplexed signal receiving system as claimed in claim 28, wherein the first square pulse train contains a video head switching signal and an audio head switching signal, the second square pulse train contains information for switching head amplifiers provided on a rotary head section of a video tape recorder, and wherein the mode information contains information for switching various switches provided on the rotary head section.

30. A multiplexed signal transmission system comprising:

means for receiving a train of square pulses aligned at a fixed phase relation with each other;

means for generating a train of edge pulses corresponding to all edges of square pulses in the train of square pulses;

means for generating edge attribute information representing an attribute of a second edge following a first edge in a same edge pulse train;

means for converting a plurality of parallel data including the edge attribute information and mode information, which includes switching information for switching head systems in a multi-head system, into serial data;

means for aligning the serial data so that the groups of serial data follow each edge pulse in the train of edge pulses;

means for generating a four-level signal having a reference signal level, a first level associated with clocks for the serial data, a second level associated with the serial data superposed on the clock and a third level associated with the edge pulses; and a fourth generator for generating a transmission multiplexed signal by frequency modulating the four-level signal.

31. A multiplexed signal transmission system as claimed in claim 30, wherein at least one of the square pulses in the train of square pulses includes a video head switching signal, and wherein the multi-head system includes an audio multi-head system.

32. A multiplexed signal transmission system as claimed in claim 30, wherein at least one of the square pulses in the train of square pulses includes an audio head switching signal, and wherein the multi-head system includes a video multi-head system.

33. A multiplexed signal transmission system as claimed in claim 30, wherein the train of square pulses includes a video head switching signal and an audio head switching signal which are selectively supplied to the means for generating a train of edge pulses.

34. A multiplexed signal receiving system comprising:

means for receiving a multiplexed signal means for demodulating a multi-level signal from the received multiplexed signal by frequency demodulation;

means for decoding serial data and an edge pulse train from the multi-level signal;

means for reproducing edge attribute information and mode information from the serial data;

means for reproducing a square pulse train from the edge attribute information;

means for detecting at least one edge of a square pulse in the square pulse train; and means for reading out head system switching information contained in the reproduced mode information at the edge detecting timing in a multi-head system overlap period.

35. A multiplexed signal transmission system as claimed in claim 34, wherein the square pulse train includes a video head switching signal, and wherein the multi-head system includes an audio multi-head system.

36. A multiplexed signal transmission system as claimed in claim 34, wherein the square pulse train includes an audio head switching signal, and the multi-head system includes a video multi-head system.

37. A multiplexed signal transmission system as claimed in claim 34, wherein the square pulse train includes a video head switching signal and an audio head switching signal which are selectively supplied to a means for generating an edge pulse train.

* * * * *